United States Patent
Kimura et al.

(10) Patent No.: US 10,766,791 B2
(45) Date of Patent: Sep. 8, 2020

(54) WATER-PURIFYING AGENT AND WATER PURIFICATION METHOD

(71) Applicant: Dexerials Corporation, Tokyo (JP)

(72) Inventors: Kazuhiro Kimura, Tochigi (JP); Koji Hirata, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 376 days.

(21) Appl. No.: 15/317,166

(22) PCT Filed: Jun. 2, 2015

(86) PCT No.: PCT/JP2015/065914
§ 371 (c)(1),
(2) Date: Dec. 8, 2016

(87) PCT Pub. No.: WO2015/190352
PCT Pub. Date: Dec. 17, 2015

(65) Prior Publication Data
US 2017/0121187 A1    May 4, 2017

(30) Foreign Application Priority Data
Jun. 10, 2014    (JP) .................................. 2014-119431

(51) Int. Cl.
*C02F 1/28* (2006.01)
*B01J 20/28* (2006.01)
(Continued)

(52) U.S. Cl.
CPC .............. *C02F 1/286* (2013.01); *B01J 2/20* (2013.01); *B01J 20/22* (2013.01); *B01J 20/24* (2013.01);
(Continued)

(58) Field of Classification Search
CPC combination set(s) only.
See application file for complete search history.

(56) References Cited

U.S. PATENT DOCUMENTS

2003/0186052 A1    10/2003    Crews et al.
2007/0170115 A1    7/2007    Skillicorn
(Continued)

FOREIGN PATENT DOCUMENTS

CN    1741882    3/2006
CN    102247814    11/2011
(Continued)

OTHER PUBLICATIONS

Extended European Search Report, issued for corresponding application No. EP 15806870.0, dated Dec. 7, 2017.
(Continued)

*Primary Examiner* — Dirk R Bass
(74) *Attorney, Agent, or Firm* — Carmody Torrance Sandak & Hennessey LLP (57) ABSTRACT

[Solution] Provided is a plant-derived water purifying agent used for water purification for industrial wastewater, etc. and including a granulated product of a plant powder, such that when a wastewater purifying treatment using the plant-derived water purifying agent is performed by an automated purifying treatment device, the water purifying agent can be suitably used in the automated purifying treatment device. It is more preferable that a Carr's fluidity index of the water purifying agent obtained by measuring 3 items of the water purifying agent, which are an angle of repose, a degree of compression, and a spatula angle be 40 or greater.

6 Claims, 2 Drawing Sheets

(51) Int. Cl.
  *B01J 20/30* (2006.01)
  *B01J 20/22* (2006.01)
  *B01J 20/24* (2006.01)
  *B01J 2/20* (2006.01)
  *C02F 1/52* (2006.01)
  *C02F 101/10* (2006.01)

(52) U.S. Cl.
  CPC ..... *B01J 20/28004* (2013.01); *B01J 20/3007* (2013.01); *B01J 20/3014* (2013.01); *B01J 20/3021* (2013.01); *C02F 1/52* (2013.01); *C02F 1/5263* (2013.01); *C02F 2101/10* (2013.01); *Y02W 10/37* (2015.05)

(56) References Cited

U.S. PATENT DOCUMENTS

| | | | |
|---|---|---|---|
| 2009/0272693 A1 | 11/2009 | Mabille et al. | |
| 2010/0269758 A1* | 10/2010 | Fuchshuber | A01K 1/0155 119/171 |
| 2013/0299433 A1* | 11/2013 | Inagaki | C02F 1/5263 210/730 |
| 2014/0234517 A1 | 8/2014 | Peng et al. | |

FOREIGN PATENT DOCUMENTS

| | | |
|---|---|---|
| CN | 102860557 | 1/2013 |
| JP | 03-098602 | 4/1991 |
| JP | 04-180884 | 6/1992 |
| JP | H11-12190 | 1/1999 |
| JP | H11-114313 | 4/1999 |
| JP | 2003-181239 | 7/2003 |
| JP | 2006-325491 | 12/2006 |
| JP | 2011-194384 | 10/2011 |
| JP | 2011-194385 | 10/2011 |
| TW | 201343505 | 11/2013 |

OTHER PUBLICATIONS

Indian Patent Office, Indian Office Action issued for corresponding Indian Patent Application No. 201637043079, dated Jul. 1, 2019.
The Patent Office of the People's Republic of China, Chinese Second Office Action issued for corresponding Chinese Patent Application No. 201580030146.3, dated Jul. 18, 2019.
The Patent Office of the People's Republic of China, Third Office Action issued in corresponding Chinese Application No. 201580030146.3, dated Dec. 30, 2019.
Zhang Chaoyun et al., "Pharmacy", Liaoning university press, p. 28, dated Oct. 31, 2013.
Taiwanese Office Action dated Jun. 11, 2020 issued in corresponding Taiwanese Patent Application No. 104118393.

* cited by examiner

WATER-PURIFYING AGENT AND WATER PURIFICATION METHOD

TECHNICAL FIELD

The present invention relates to a plant-derived water purifying agent used for purifying water such as industrial wastewater and a water purifying method using the water purifying agent.

BACKGROUND ART

Various studies are conducted for removing unnecessary substances from industrial wastewater to purify the water.

Studies are also actively conducted for water purifying agents intended for removing, for example, nickel, copper, or fluorine from inorganic industrial wastewater.

For example, there is proposed a method of adsorbing heavy metal ions included in wastewater to leafy vegetables such as mulukhiya, and separating and removing the leafy vegetables from the wastewater together with the adsorbed heavy metal ions by solid-liquid separation (see, e.g., PTL 1).

For example, there is also proposed a method of adsorbing heavy metal ions included in wastewater to cation exchangers made of leafy vegetables such as mulukhiya to separate and remove the heavy metal ions from the wastewater (see, e.g., PTL 2).

The more the amount of wastewater to be purified, the more the amount of unnecessary substances included in wastewater, or the more the kinds of unnecessary substances included in wastewater, the more it is desired to construct a system configured to automatically feed a purifying agent necessary for treatments for purifying the wastewater.

Automation of the device is an important issue for performing high-speed, stable purifying treatments.

On the other hand, there is also a request for saving device costs.

However, techniques hitherto proposed are not at all intended for automated devices for wastewater purifying treatments. When these techniques are used in automated devices, there is a problem in stable feeding. Therefore, these water purifying agents cannot be said to be suitable for use in automated system devices.

Hence, for constructing an automated system for a wastewater purifying device using a plant-based water purifying agent, what is required is a water purifying agent suitable for use in an automated purifying device capable of performing low-cost, stable feeding.

CITATION LIST

Patent Literature

PTL 1: Japanese Patent Application Laid-Open (JP-A) No. 2011-194384
PTL 2: JP-A No. 2011-194385

SUMMARY OF INVENTION

Technical Problem

The present invention aims to solve the various problems in the related art and achieve an object described below. That is, the present invention has an object to provide a water purifying agent suitable for use in an automated purifying device capable of performing low-cost, stable feeding when a wastewater purifying treatment using a plant-derived water purifying agent is performed with an automated purifying device, and a water purifying method using the water purifying agent.

Solution to Problem

Means for solving the above problems are as follows.
<1> A water purifying agent, including:
  a granulated product of a plant powder.
<2> The water purifying agent according to <1>,
  wherein a Carr's fluidity index of the water purifying agent is 40 or greater, the Carr's fluidity index being obtained by measuring 3 items of the water purifying agent, which are an angle of repose, a degree of compression, and a spatula angle.
<3> The water purifying agent according to <1> or <2>,
  wherein a Carr's fluidity index of the water purifying agent is 50 or greater, the Carr's fluidity index being obtained by measuring 3 items of the water purifying agent, which are an angle of repose, a degree of compression, and a spatula angle.
<4> The water purifying agent according to any one of <1> to <3>, further including:
  a plant powder.
<5> The water purifying agent according to <4>,
  wherein a ratio by mass (granulated product/powder) of a content of the granulated product of the plant powder relative to the plant powder is 6/1 or greater.
<6> The water purifying agent according to <4> or <5>,
  wherein a ratio by mass (granulated product/powder) of a content of the granulated product of the plant powder relative to the plant powder is 8/1 or greater.
<7> The water purifying agent according to any one of <1> to <6>,
  wherein a degree of compression of the water purifying agent is 20% or less.
<8> The water purifying agent according to any one of <1> to <7>,
  wherein a spatula angle of the water purifying agent is 60° or less.
<9> The water purifying agent according to any one of <1> to <8>,
  wherein a plant of the plant powder is *Corchorus olitorius*.
<10> The water purifying agent according to any one of <1> to <9>,
  wherein the granulated product of the plant powder is produced by a producing method including a plant powder producing step of grinding a dried plant to obtain the plant powder having a number average particle diameter of 450 μm or less and a plant powder granulating step of kneading the plant powder to which water is added and subjecting the resultant to extrusion granulation to obtain the granulated product of the plant powder.
<11> A water purifying method, including:
  dissolving the water purifying agent according to any one of <1> to <10> in water to obtain a dispersion liquid of the plant powder, and feeding the dispersion liquid to wastewater to remove an unnecessary inorganic substance included in the wastewater.

Advantageous Effects of Invention

The present invention can solve the various problems in the related art, achieve the object described above, and provide a water purifying agent suitable for use in an automated purifying device capable of performing low-cost, stable feeding when a wastewater purifying treatment using a plant-derived water purifying agent is performed with an automated purifying device, and a water purifying method using the water purifying agent.

DESCRIPTION OF EMBODIMENTS (Water Purifying Agent)

A water purifying agent of the present invention contains a granulated product of a plant powder.

"Water purification" as used in the present invention refers to removal of unnecessary substances such as nickel, copper, and fluorine included in wastewater. Targets of water purification include industrial wastewater, particularly, inorganic industrial wastewater.

When the water purifying agent is added in the wastewater, unnecessary substances in the wastewater are coagulatively separated by the water purifying agent. When such a coagulated matter is removed from the wastewater, the wastewater is purified.

<Plant>

The plant is not particularly limited so long as the plant can coagulatively separate unnecessary substances (e.g., nickel, copper, and fluorine) included in wastewater. Examples of the plant include *Corchorus olitorius*, mulukhiya, Japanese mustard spinach, Japanese honewort, potherb mustard, and spinach. Among these plants, *Corchorus olitorius* and mulukhiya, which exhibited good results in Examples described below, are preferable, and *Corchorus olitorius* is more preferable.

Any part of a plant such as leaf, stalk, and root may be used. However, leaf is more preferable.

<Granulated Product of Plant Powder>

When a granulated product of a plant powder is used as the water purifying agent, continuous stable feeding of the water purifying agent by an automated purifying device is possible.

The present inventors have studied an automated system for a wastewater purifying device using a water purifying agent made of a plant powder and found that use of a water purifying agent made of a plant powder causes problems described below.

In an automated system, various kinds of water purifying agents used for water purifying treatments are once stored in hoppers (storage tanks). After this, a water purifying agent desired to be fed to wastewater is quantified by a quantitative machine, and a predetermined amount of the water purifying agent is fed to wastewater in a reaction tank. Here, when a water purifying agent is solid, the water purifying agent is once dissolved in a dissolving tank before sent to the reaction tank, and then sent to the reaction tank. That is, a solid water purifying agent in a hopper is quantified by the quantitative machine, input into the dissolving tank, and dissolved with a predetermined amount of water in the dissolving tank under stirring, and the obtained dispersion liquid is sent to the reaction tank and fed to the wastewater.

In applying this system in an existing device, it is desirable, in terms of cost saving, to apply this system to a water purifying agent made of a plant powder in the same manner as applying the system to any other water purifying agent such as a polymer coagulant.

However, it has been found that when sending a water purifying agent made of a plant powder to the dissolving tank after storage in the hopper, a bridge (i.e., a phenomenon that the water purifying agent adheres to wall surfaces or is compressed in a lower portion of the hopper to disturb outflow of upper part of the water purifying agent) or a rat hole (i.e., a phenomenon that it becomes possible for only part of the water purifying agent to outflow, and surrounding part of the water purifying agent becomes stationary (or stays behind) in the hopper from the lower portion to the upper portion) is formed in the hopper. This leads to problems in feeding, so the water purifying agent cannot be sent to the dissolving tank, or the water purifying agent cannot be quantified precisely by the quantitative machine.

In order to prevent a bridge or a rat hole in the hopper, there is a means of increasing the particle size of the water purifying agent in order to improve fluidity of the water purifying agent made of powder. However, classifying a ground plant for using only such part that has a large particle size reduces production yield and increases costs. Moreover, with this means, it is impossible to sufficiently cope with the above-described problems in use of a plant powder.

The present inventors have conducted various experiments about the problems and found that the problems of bridge and rat hole are largely attributed to plant fiber, that a granulated product is effective for preventing entanglement of plant fiber and increasing a fluidity index of a water purifying agent made of a plant, and that use of a water purifying agent made of the granulated product can solve the problems of bridge and rat hole. Particularly, it has been found possible to effectively suppress formation of the bridge or rat hole when the fluidity index of the water purifying agent made of a plant is equal to or greater than a predetermined value.

The predetermined value is a standard value specific to plant powders and different from a standard value for fluidity index generally required of powders. It has been found that a granulated product is a preferable form for satisfying the standard value.

Forms (diameter and length) of the granulated product are not particularly limited and may be appropriately selected in relation with a producing method described below. However, in order to adapt the granulated product to a wide range of the size of feeding ports of commercially available quantitative machines, the diameter of the granulated product is preferably 3 mm or less and the length of the granulated product is preferably 3 mm or less. Further, in order to make the granulated product smoothly passable through the feeding port, and also in consideration of solubility in the dissolution, the diameter of the granulated product is more preferably 1 mm or less and the length of the granulated product is more preferably 1 mm or less.

<<Fluidity Index of Granulated Product>>

A Carr's fluidity index of the water purifying agent obtained by measuring 3 items of the water purifying agent, which are an angle of repose, a degree of compression, and a spatula angle, is preferably 40 or greater and more preferably 50 or greater.

Here, an angle of repose, a degree of compression, and a spatula angle refer to an angle of repose, a degree of compression, and a spatula angle raised as measurement items for Carr's fluidity index (R. L. Carr. 'Evaluating Flow Properties of Solids' Chemical Engineering, Jan. 18, 1965).

The angle of repose, the degree of compression, and the spatula angle can be measured with, for example, various types of commercially available powder physical property measurement devices. Specifically, for example, these properties can be measured with POWDER TESTER PT-N TYPE (available from Hosokawa Micron Corporation) according to methods described below.

For obtaining a fluidity index based on the obtained angle of repose, degree of compression, and spatula angle, it is possible to use a standard generally known as Carr's fluidity index.

In the present invention, the Carr's fluidity index table generated by Hosokawa Micron Corporation based on the aforementioned Chemical Engineering, January 18. (1965) on page 166 and page 167 under authorization of R. L. Carr and McGraw-Hill Inc. and made known to the public by Hosokawa Micron Corporation is used.

Table 1 presents a table of fluidity indices with respective to 3 items related with the present invention, which are an angle of repose, a degree of compression, and a spatula angle, among evaluation items of Carr's fluidity index. Based on Table 1, an index for an angle of repose, an index for a degree of compression, and an index for a spatula angle corresponding to measured values of the angle of repose, the degree of compression, and the spatula angle respectively are obtained, and these index values are totaled. The total value is used as the fluidity index of the water purifying agent. When obtaining indices corresponding to the measured values from Table 1, the measured values are classified based on their rounded-off values. For example, an angle of repose of 41.8 is classified not as 41 but as 42, and the index is counted as 16. For example, an angle of repose of 46.5 is classified not as 46 but as 47, and the index is counted as 12. The degree of compression and spatula angle are likewise classified into pertinent value ranges based on their rounded-off values, and the corresponding indices are obtained.

It is known that a fluidity index of powder is evaluated based on 4 items, which are an angle of repose, a degree of compression, a spatula angle, and uniformity (or a degree of agglomeration) of Carr's fluidity index. The present inventors have found that 3 items, which are an angle of repose, a degree of compression, and a spatula angle, and particularly 2 items, which are a degree of compression and a spatula angle, are largely influential to the fluidity of a water purifying agent made of a plant, and that improvement of these values is hence effective for solving the above-described problems in the hopper.

Granulation of a powder obtained from a plant can increase fluidity indices for an angle of repose, a degree of compression, and a spatula angle, and particularly, a degree of compression and a spatula angle, and makes it possible to obtain a water purifying agent having the fluidity index of 40 or greater.

In an automated system as referred to in the present invention, when the fluidity index of a water purifying agent made of a plant is 50 or greater, a bridge or a rat hole is not formed in the hopper, and the water purifying agent can be continuously fed to the dissolving tank stably.

When the fluidity index of a water purifying agent made of a plant is 40 or greater but less than 50, the water purifying agent can be continuously fed to the dissolving tank although the hopper needs some measures. Even if a bridge or a rat hole is once formed, the bridge or rat hole is collapsed by application of a vibration to the hopper, and it becomes possible to perform continuous feeding again. The measures are, for example, vibration members configured to collapse a bridge or a rat hole formed.

When the fluidity index of a water purifying agent made of a plant is less than 40, a bridge or a rat hole is formed, and the bridge or rat hole cannot be broken off even by application of a vibration to the hopper. Therefore, stable feeding is impossible.

TABLE 1

| Fluidity index | Angle of repose | | Degree of compression | | Spatula angle | |
|---|---|---|---|---|---|---|
| | Degree | Index | % | Index | Degree | Index |
| 67.5 to 75 | <26 | 25 | <6 | 25 | <26 | 25 |
| | 26 to 29 | 24 | 6 to 9 | 23 | 26 to 30 | 24 |
| | 30 | 22.5 | 10 | 22.5 | 31 | 22.5 |
| 60 to 67 | 31 | 22 | 11 | 22 | 32 | 22 |
| | 32 to 34 | 21 | 12 to 14 | 21 | 33 to 37 | 21 |
| | 35 | 20 | 15 | 20 | 38 | 20 |
| 52.5 to 59.5 | 36 | 19.5 | 16 | 19.5 | 39 | 19.5 |
| | 37 to 39 | 18 | 17 to 19 | 18 | 40 to 44 | 18 |
| | 40 | 17.5 | 20 | 17.5 | 45 | 17.5 |
| 45 to 52 | 41 | 17 | 21 | 17 | 46 | 17 |
| | 42 to 44 | 16 | 22 to 24 | 16 | 47 to 59 | 16 |
| | 45 | 15 | 25 | 15 | 60 | 15 |
| 30 to 44.5 | 46 | 14.5 | 26 | 14.5 | 61 | 14.5 |
| | 47 to 54 | 12 | 27 to 30 | 12 | 62 to 74 | 12 |
| | 55 | 10 | 31 | 10 | 75 | 10 |
| 15 to 29.5 | 56 | 9.5 | 32 | 9.5 | 76 | 9.5 |
| | 57 to 64 | 7 | 33 to 36 | 7 | 77 to 89 | 7 |
| | 65 | 5 | 37 | 5 | 90 | 5 |
| 0 to 13.5 | 66 | 4.5 | 38 | 4.5 | 91 | 4.5 |
| (14.5) | 67 to 89 | 2 | 39 to 45 | 2 | 92 to 99 | 2 |
| | 90 | 0 | >45 | 0 | >99 | 0 |

In the present invention, when the fluidity index of the water purifying agent is 40 or greater, the water purifying agent can be continuously fed to the dissolving tank although the hopper needs some measures. Hence, the water purifying agent may contain a plant powder within a range in which the fluidity index of the water purifying agent satisfies the condition of 40 or greater. That is, so long as the fluidity index satisfies the condition of 40 or greater (preferably 50 or greater), the water purifying agent of the present invention may be in a form made of only a granulated product of a plant powder or may be in a form made of a mixture of a granulated product of a plant powder and a plant powder.

When the water purifying agent is made of a mixture of a granulated product of a plant powder and a plant powder, a ratio by mass (granulated product/powder) of the content of the granulated product of the plant powder relative to the plant powder is preferably 6/1 or greater and more preferably 8/1 or greater.

In order to provide the water purifying agent with a desired fluidity index value, it is preferable that the degree of compression of the water purifying agent be 20% or less.

Here, the degree of compression (%) is a value expressed by formula (1) below.

$$\text{Degree of compression (\%)} = \{(Da-Db)/Da\} \times 100 \quad (1)$$

Da (compressed apparent specific gravity): a specific gravity of a powder, a grain, or both of a powder and a grain measured after the powder, the grain, or both of the powder and the grain loaded in a container having a predetermined capacity is/are vibrated by being let to fall from a height of 2 cm repeatedly 180 times Db (loose apparent specific gravity): a specific gravity of a powder, a grain, or both of a powder and a grain measured when the powder, the grain, or both of the powder and the grain is/are calmly loaded into a container having a predetermined capacity Further, in order to provide the water purifying agent with a desired fluidity index value, it is preferable that the spatula angle of the water purifying agent be 60° or less.

In considering fluidity index, it is more reliable to measure a degree of compression and a spatula angle than to measure an angle of repose for evaluating the fluidity of the water purifying agent of the present invention. Therefore, in the present invention, a fluidity index (may also be referred to as "fluidity index (2)") obtained by measuring 2 items of the water purifying agent, which are a degree of compression and a spatula angle, may be used as a judgment criterion. In this case, the fluidity index (2) is preferably 27 or greater, more preferably 28 or greater, yet more preferably 34 or greater, and particularly preferably 38 or greater.

The water purifying agent of the present invention made of a granulated product of a plant powder exhibits a preferable value mentioned above as the fluidity index (2).

The angle of repose, the degree of compression, and the spatula angle can be obtained in the manners described below.

[Measurement of Angle of Repose (°)]

The angle of repose (°) can be measured with POWDER TESTER PT-N TYPE (available from Hosokawa Micron Corporation) according to an injection method described below.

A measurement sample is let to fall onto a circular receptacle table through a funnel and form a mountain-shaped layer. An angle formed between a slope of the mountain and a horizontal plane is measured.

[Measurement of degree of compression (°)]

Da (compressed apparent specific gravity) and Db (loose apparent specific gravity) for the degree of compression can be measured with POWDER TESTER PT-N TYPE (available from Hosokawa Micron Corporation).

A dedicated cap is attached on top of a 100 cc stainless steel cup. A sample (from 150 cc through 200 cc) is loaded into the cup. The specific gravity of the sample after the sample is vibrated by being let to fall from a height of 2 cm repeatedly 180 times is measured as Da.

The sample (100 cc) is calmly loaded into the 100 cc stainless steel cup, and the specific gravity of the sample at the time is measured as Db.

The Da and Db values are assigned into formula (1) above.

[Measurement of spatula angle (°)]

The spatula angle (°) can be measured with POWDER TESTER PT-N TYPE (available from Hosokawa Micron Corporation).

A sample is deposited on a rectangular spatula put horizontally in a manner to conceal the spatula. A cross-sectional angle (A) of a mountain formed when the spatula is slowly lifted up vertically, and a cross-sectional angle (B) of a mountain formed after the mountain of the powder is collapsed by application of a certain impact are measured. These values are assigned into formula (2) below to calculate the spatula angle (°).

$$\text{Spatula angle}(°) = \{(A+B)/2\} \quad (2)$$

<<Method for Producing Granulated Product of Plant Powder>>

The water purifying agent is produced by a producing method including a plant powder producing step of grinding a dried plant to obtain a plant powder having a number average particle diameter of 450 μm or less (preferably 250 μm or less) and a plant powder granulating step of kneading the plant powder to which water is added and subjecting the resultant to extrusion granulation to obtain a granulated product of the plant powder.

In order to produce a granulated product having a desired fluidity index, it is desirable to produce a powder of a plant before the granulating step. This is because entanglement of plant fiber can be prevented.

For obtaining a plant powder, it is desirable to firstly dry the plant by sun drying until the water content becomes 14% or less (preferably 5% or less). Next, the dried plant is ground by, for example, an atomizer (a hammer mill available from Dulton Co., Ltd.) to a number average particle diameter of 450 μm or less.

Here, the number average particle diameter can be measured with, for example, MORPHOLOGI G3 (available from Malvern Instruments Ltd.)

Next, the obtained plant powder is kneaded with water added to the plant powder. For example, the amount of water to be added is preferably from 15% by mass through 43% by mass of the plant powder.

The kneader/granulator is not particularly limited, and a commercially available granulator may be used. Examples of the commercially available granulator include an extruding granulator (DISK PELLETER available from Dulton Co., Ltd.).

After kneading, the kneaded product is extruded by the granulator, to obtain a granulated product. The granulated product is dried by a fluidized bed dryer until the water content becomes 2% or less.

After this, the granulated product is cut into equal pieces having a predetermined length by a POWER MILL P3 type crusher (available from Showa Kagaku Kikai Co., Ltd.). In this way, the granulated product of the plant powder of the present invention is obtained.

(Water Purifying Method)

A water purifying method of the present invention is a method of dissolving the water purifying agent of the present invention described above in water to obtain a dispersion liquid of the plant powder, and feeding the dispersion liquid to wastewater to remove unnecessary inorganic substances included in the wastewater.

The water purifying agent is quantified by a quantitative machine and then supplied into a dissolving tank.

The water purifying agent is dissolved in a predetermined amount of water, and the obtained dispersion liquid of the water purifying agent is sent to a reaction tank and fed to wastewater. In the reaction tank, unnecessary matters in the wastewater are coagulatively separated by the water purifying agent. When the coagulated matter is removed, the wastewater is purified.

EXAMPLES

The present invention will be more specifically described below by way of Examples and Comparative Examples. The present invention should not be construed as being limited to these.

In Examples, an angle of repose, a degree of compression, and a spatula angle were measured in the manners described below.

[Measurement of Angle of Repose (°)]

An angle of repose (°) was measured with POWDER TESTER PT-N TYPE (available from Hosokawa Micron Corporation) according to an injection method described below.

A measurement sample was let to fall onto a circular receptacle table through a funnel and form a mountain-shaped layer. An angle formed between a slope of the mountain and a horizontal plane was measured.

[Measurement of Degree of Compression (%)]

Da (compressed apparent specific gravity) and Db (loose apparent specific gravity) for a degree of compression were measured with POWDER TESTER PT-N TYPE (available from Hosokawa Micron Corporation).

A dedicated cap was attached on top of a 100 cc stainless steel cup. A sample (from 150 cc through 200 cc) was loaded into the cup. The specific gravity of the sample after the sample was vibrated by being let to fall from a height of 2 cm repeatedly 180 times was measured as Da.

The sample (100 cc) was calmly loaded into the 100 cc stainless steel cup, and the specific gravity of the sample at the time was measured as Db.

The Da and Db values were assigned into formula (1) below to calculate a degree of compression (%).

$$\text{Degree of compression (\%)} = \{(Da-Db)/Da\} \times 100 \quad (1)$$

[Measurement of Spatula Angle (°)]

A spatula angle (°) was measured with POWDER TESTER PT-N TYPE (available from Hosokawa Micron Corporation).

A sample was deposited on a rectangular spatula put horizontally in a manner to conceal the spatula. A cross-sectional angle (A) of a mountain formed when the spatula was slowly lifted up vertically, and a cross-sectional angle (B) of a mountain formed after the mountain of the powder was collapsed by application of a certain impact were measured. These values were assigned into formula (2) below to calculate a spatula angle (°).

$$\text{Spatula angle}(°) = \{(A+B)/2\} \quad (2)$$

<Production of Plant Powder A>

Chinese-grown *Corchorus olitorius* was dried by sun drying until the water content became 14% or less.

Next, the dried plant was ground by an atomizer (a hammer mill available from Dulton Co., Ltd.) to a number average particle diameter of 450 μm or less, to obtain a plant powder A.

<Production of Plant Powder B>

Mie Prefecture-grown mulukhiya was dried by sun drying until the water content became 14% or less.

Next, the dried plant was ground by an atomizer (a hammer mill available from Dulton Co, Ltd.) to a number average particle diameter of 450 μm or less, to obtain a plant powder B.

Example 1

Water was added to the plant powder A such that a water content ratio would be 15% by mass, and the plant powder to which water was added was kneaded. The kneaded product was extruded using an extruding granulator (DISK PELLETER available from Dulton Co., Ltd.), to obtain a granulated product. The size of dies (φ) of the granulator was set to 2 mm, to obtain a granulated product having a diameter of about 2 mm. This granulated product was dried by a fluidized bed dryer until the water content became 2% or less. After this, the granulated product was cut off by a length (L) of about 20 mm by a POWER MILL P3 type crusher, to obtain a granulated product 1.

The granulated product 1 was subjected to the measurements described above to obtain an angle of repose, a degree of compression, and a spatula angle. The fluidity index was obtained based on the indices in Table 1 presented above. The results are presented in Table 3.

Feeding stability of a water purifying agent made of the granulated product 1 was evaluated in a manner described below. The result is presented in Table 3.

<Evaluation of Feeding Stability>

The granulated product 1 obtained above was put into a hopper having an angle of 60 degrees such that the granulated product 1 would be automatically fed into a dissolving tank. Here, whether it was possible to feed the granulated product stably was evaluated according to the criteria described below.

—Evaluation Criteria—

A: A bridge or a rat hole was not formed, and it was possible to perform stable feeding continuously.

B: Although a bridge or a rat hole was formed, it was possible to perform feeding continuously because the bridge or rat hole was broken off by application of a vibration to the hopper.

C: A bridge or a rat hole was formed, and it became impossible to perform stable feeding because the bridge or rat hole was not broken off even by application of a vibration to the hopper.

Example 2

A water purifying agent was obtained in the same manner as in Example 1, except that the dies size (φ) and length (L) for granulation were changed from Example 1 to as presented in Table 2.

An angle of repose, a degree of compression, a spatula angle, a fluidity index, and feeding stability were obtained in the same manner as in Example 1. The results are presented in Table 3.

Example 3

A water purifying agent was obtained in the same manner as in Example 1, except that the plant powder A was kneaded with water added at a water content ratio changed from Example 1 to 43% by mass, and the dies size (φ) and length (L) for granulation were changed from Example 1 to as presented in Table 2.

An angle of repose, a degree of compression, a spatula angle, a fluidity index, and feeding stability were obtained in the same manner as in Example 1. The results are presented in Table 3.

Figure 1A:
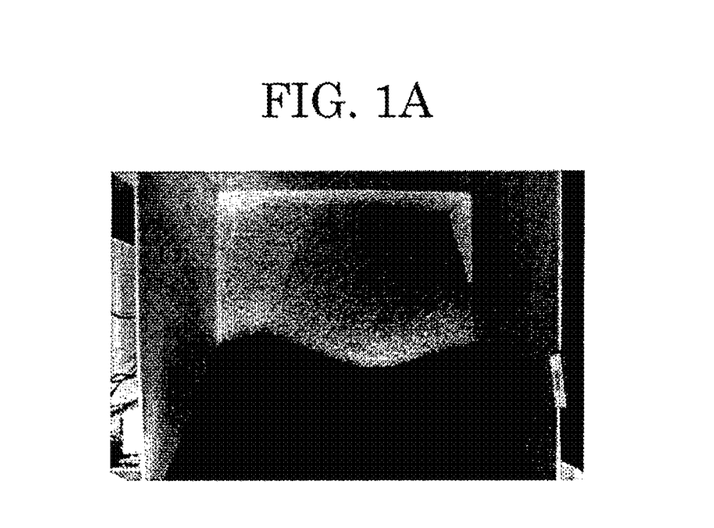
FIG. 1A is an image illustrating a state of a water purifying agent of Example 3 in a hopper, seen from above the hopper.
Figure 1B:
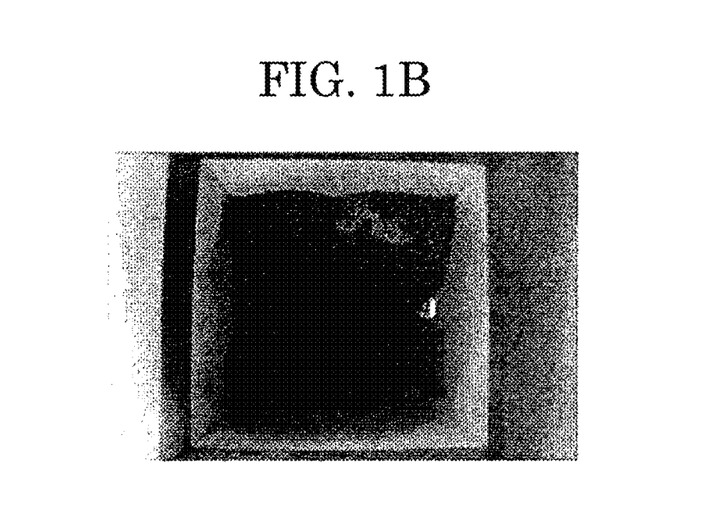
FIG. 1B is an image illustrating a state of a water purifying agent of Example 3 in a hopper, seen from above the hopper.

The water purifying agent of Example 3 outflowed uniformly without being stuck within the hopper, and was able to be stably fed by the automated system. FIG. 1A and FIG. 1B illustrate images of the state within the hopper, seen from above the hopper. FIG. 1B illustrates a uniformly outflowing state of the water purifying agent illustrated in FIG. 1A.

Examples 4 to 6

The granulated product of Example 3 and the plant powder A were mixed at the ratios presented in Table 2 to obtain water purifying agents.

Note that the description "granulated product:powder=8: 1" in Table 2 means that the granulated product of the plant powder was contained at a ratio by mass (granulated product powder) relative to the plant powder of 8:1.

An angle of repose, a degree of compression, a spatula angle, a fluidity index, and feeding stability were obtained in the same manner as in Example 1. The results are presented in Table 3.

Figure 2:
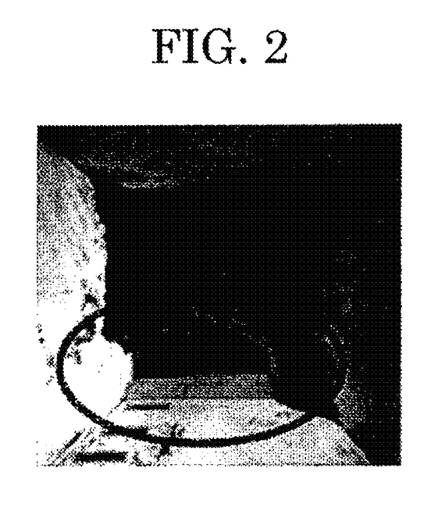
FIG. 2 is an image illustrating a state of a water purifying agent of Example 6 in a hopper, seen from above the hopper.

The water purifying agent of Example 6 only partly outflowed from the hopper, and the surrounding part was stuck within the hopper to remain in a shape of a hole to form a rat hole. However, when the hopper was vibrated, the water purifying agent was collapsed, and then became able to be fed continuously. FIG. 2 illustrates an image of the state of the rat hole in the hopper formed before a vibration was applied in Example 6, seen from above the hopper.

Example 7

A water purifying agent was obtained in the same manner as in Example 1, except that the plant powder A used in Example 1 was changed to the plant powder B and the dies size (φ) and length (L) for granulation were changed from Example 1 to as presented in Table 2.

An angle of repose, a degree of compression, a spatula angle, a fluidity index, and feeding stability were obtained in the same manner as in Example 1. The results are presented in Table 3.

Example 8

A water purifying agent was obtained in the same manner as in Example 3, except that the plant powder A used in Example 3 was changed to the plant powder B and the dies size (φ) and length (L) for granulation were changed from Example 3 to as presented in Table 2.

An angle of repose, a degree of compression, a spatula angle, a fluidity index, and feeding stability were obtained in the same manner as in Example 1. The results are presented in Table 3.

Comparative Example 1

An example in which a water purifying agent made of the plant powder A was used was Comparative Example 1.

The plant powder A was subjected to the measurements described above to obtain an angle of repose, a degree of compression, and a spatula angle. The fluidity index was obtained based on the indices in Table 1 presented above. Feeding stability was obtained in the same manner as in Example 1. The results are presented in Table 3.

Comparative Examples 2 to 4

Water purifying agents were obtained in the same manner as in Comparative Example 1, except that the average particle diameter of the powder was changed from Comparative Example 1 to as presented in Table 2.

An angle of repose, a degree of compression, a spatula angle, a fluidity index, and feeding stability were obtained in the same manner as in Comparative Example 1. The results are presented in Table 3.

Comparative Example 5

An example in which a water purifying agent made of the plant powder B was used was Comparative Example 5.

An angle of repose, a degree of compression, a spatula angle, a fluidity index, and feeding stability of the plant powder B were obtained in the same manner as in Comparative Example 1. The results are presented in Table 3.

TABLE 2

| | | Water purifying agent | | |
|---|---|---|---|---|
| | Kind of plant | Constitution | φ (mm) | L (mm) |
| Ex. 1 | Corchorus olitorius | Granulated product | 2 | 20 |
| Ex. 2 | Corchorus olitorius | Granulated product | 1.5 | 10 |
| Ex. 3 | Corchorus olitorius | Granulated product | 0.8 | 2 |
| Ex. 4 | Corchorus olitorius | Granulated product:powder 8:1 | System in which granulated product of Ex. 3 and powder of Comp. Ex. 1 were mixed | |
| Ex. 5 | Corchorus olitorius | Granulated product:powder 7:1 | System in which granulated product of Ex. 3 and powder of Comp. Ex. 1 were mixed | |
| Ex. 6 | Corchorus olitorius | Granulated product:powder 6:1 | System in which granulated product of Ex. 3 and powder of Comp. Ex. 1 were mixed | |
| Ex. 7 | Mulukhiya | Granulated product | 2 | 20 |
| Ex. 8 | Mulukhiya | Granulated product | 0.8 | 2 |
| Comp. Ex. 1 | Corchorus olitorius | Powder | Average particle diameter: 450 μm (without classification and granulation) | |
| Comp. Ex. 2 | Corchorus olitorius | Powder | 500 μm or greater (classification) | |
| Comp. Ex. 3 | Corchorus olitorius | Powder | From 180 μm through 500 μm (classification) | |
| Comp. Ex. 4 | Corchorus olitorius | Powder | 180 μm or less (classification) | |
| Comp. Ex. 5 | Mulukhiya | Powder | Average particle diameter: 450 μm (without classification and granulation) | |

TABLE 3

| | Angle of repose (°) | Degree of compression (%) | Spatula angle (°) | Fluidity index | Feeding stability |
|---|---|---|---|---|---|
| Ex. 1 | 43.7 | 3.65 | 35.9 | 62 | A |
| Ex. 2 | 41.8 | 7.06 | 56.2 | 55 | A |
| Ex. 3 | 46.5 | 7.31 | 59.6 | 50 | A |
| Ex. 4 | 41.1 | 19.0 | 58.9 | 51 | A |
| Ex. 5 | 47.1 | 22.1 | 65.4 | 40 | B |
| Ex. 6 | 46.3 | 23.5 | 65.5 | 42.5 | B |
| Ex. 7 | 49.5 | 5.3 | 48.0 | 53 | A |
| Ex. 8 | 51.6 | 9.2 | 53.7 | 51 | A |
| Comp. Ex. 1 | 52.2 | 40.4 | 73.7 | 26 | C |
| Comp. Ex. 2 | 50.4 | 26.9 | 69.0 | 36 | C |
| Comp. Ex. 3 | 53.4 | 28.8 | 76.9 | 31 | C |
| Comp. Ex. 4 | 52.9 | 42.2 | 73.7 | 26 | C |
| Comp. Ex. 5 | 52.8 | 43.0 | 74.0 | 26 | C |

With the water purifying agents of Examples 1 to 3, 7, and 8, formation of a bridge was not confirmed.

With the water purifying agents of Examples 4 to 6 in which the granulated product of Example 3 and the powder of Comparative Example 1 were mixed at the specified ratios, a bridge was not formed in Example 4, whereas in Examples 5 and 6, a bridge was once formed but was broken off by application of a vibration to the hopper, and it became possible to perform feeding continuously again.

However, with the water purifying agents made of a plant powder of Comparative Examples 1 to 5, a bridge was formed. The bridge was not broken off even by application of a vibration to the hopper, and it was impossible to perform stable feeding continuously.

The invention claimed is:

1. A water purifying agent, comprising:
   a granulated product of a plant powder, wherein the granulated product of the plant powder is produced by extrusion granulation; and
   wherein a Carr's fluidity index of the water purifying agent is 50 or greater, the Carr's fluidity index being obtained by measuring 3 items of the water purifying agent, which are an angle of repose, a degree of compression, and a spatula angle;
   wherein the degree of compression of the water purifying agent is 20% or less; and
   wherein the spatula angle of the water purifying agent is 60° or less; and
   wherein the granulated product of the plant powder is produced by a producing method that comprises: grinding a dried plant to obtain the plant powder having a number average particle diameter of 450 μm or less; and kneading the plant powder to which water is added prior to subjecting a resultant to extrusion granulation to obtain the granulated product of the plant powder, and
   wherein an amount of water added to the plant powder during kneading is from 15% by mass to 43% by mass of the plant powder.

2. The water purifying agent according to claim 1, further comprising:
   a plant powder.

3. The water purifying agent according to claim 2, wherein a ratio by mass (granulated product/powder) of a content of the granulated product of the plant powder relative to the plant powder is 6/1 or greater.

4. The water purifying agent according to claim 3, wherein the ratio by mass (granulated product/powder) of the content of the granulated product of the plant powder relative to the plant powder is 8/1 or greater.

5. The water purifying agent according to claim 1, wherein a plant of the plant powder is *Corchorus olitorius*.

6. A water purifying method, comprising:
   dissolving the water purifying agent according to claim 1 in water to obtain a dispersion liquid of the plant powder, and feeding the dispersion liquid to wastewater to remove an unnecessary inorganic substance included in the wastewater.

* * * * *